(12) United States Patent
Prat et al.

(10) Patent No.: US 9,061,424 B2
(45) Date of Patent: Jun. 23, 2015

(54) PROCESS FOR POSITIONING AN ASSEMBLY TOOL ON THE END OF AN ARTICULATED ARM AND DEVICE FOR ITS IMPLEMENTATION

(75) Inventors: Philippe Prat, Cestas (FR); Jean Malvaut, Leognan (FR); Franck Villegoureix, Pessac (FR)

(73) Assignee: KUKA Aktiengesellschaft, Augsburg (DE)

( * ) Notice: Subject to any disclaimer, the term of this patent is extended or adjusted under 35 U.S.C. 154(b) by 1330 days.

(21) Appl. No.: 12/278,398

(22) PCT Filed: Feb. 2, 2007

(86) PCT No.: PCT/FR2007/050741
§ 371 (c)(1),
(2), (4) Date: Aug. 6, 2008

(87) PCT Pub. No.: WO2007/090981
PCT Pub. Date: Aug. 16, 2007

(65) Prior Publication Data
US 2009/0018697 A1 Jan. 15, 2009

(30) Foreign Application Priority Data
Feb. 7, 2006 (FR) .................. 06 50428

(51) Int. Cl.
*B21J 15/14* (2006.01)
*B25J 15/00* (2006.01)
*B25J 17/02* (2006.01)

(52) U.S. Cl.
CPC .............. *B25J 15/0019* (2013.01); *B21J 15/14* (2013.01); *B21J 15/142* (2013.01); *B25J 17/0208* (2013.01)

(58) Field of Classification Search
CPC ...... B21J 15/14; B21J 15/142; B25J 15/0019; B25J 17/0208; B23B 49/00; B23B 39/14; B23B 47/34; B23B 2215/04; B23Q 17/2233; B23Q 9/0014; G05B 19/404; G05B 2219/37582; G05B 2219/39574; G05B 2219/40558; G05B 2219/45059; G05B 2219/45129; G05B 2219/50356; Y10T 408/03; Y10T 408/50; Y10T 408/175; Y10T 408/5623; G06F 19/00

See application file for complete search history.

(56) References Cited

U.S. PATENT DOCUMENTS

| | | | | |
|---|---|---|---|---|
| 4,948,308 A | * | 8/1990 | Giannuzzi et al. | 408/97 |
| 5,088,171 A | * | 2/1992 | Suzuki | 29/26 A |
| 5,482,409 A | * | 1/1996 | Dunning et al. | 408/1 R |
| 5,848,859 A | * | 12/1998 | Clark et al. | 408/1 R |
| 6,138,897 A | * | 10/2000 | Allor et al. | 228/114.5 |
| 2005/0172481 A1 | | 8/2005 | Herrmann et al. | |

FOREIGN PATENT DOCUMENTS

EP  0 448 777 A2  10/1991

OTHER PUBLICATIONS

Zhou_Chapter10.pdf; Zhou (http://portal.mem.drexel.edu/zhou/linkclick.aspx?fileticket=mCfXqUl8mas%3D&tabid=63, Chapter 10 Threaded Fasteners and Power Screws, Dec. 8, 2005, pp. 1-11).*
Google search results.pdf; Google search results (pp. 1-2).*

* cited by examiner

*Primary Examiner* — Bao Long T Nguyen
(74) *Attorney, Agent, or Firm* — Wood, Herron & Evans, LLP

(57) ABSTRACT

The invention relates to a method for positioning an effector (12) in relation to a surface (14), said effector (12) comprising at least one tool for performing an assembly step such as drilling or riveting, and being attached to the end of an articulated arm (10) which is able to apply an effort against the surface (14) by means of the effector (12), the effector (12) comprising a front wall (22) facing the surface (14). The inventive method is characterized in that it involves measuring a relative movement between the front wall (22) and a support plate (30) comprising at least one part which can be supported directly or indirectly against the surface (14) and can be immobile in relation to the surface and connected to the front plate (22) in such a way as to be able to be displaced in at least one direction and to control the articulated arm (10) such that it performs a movement for compensating the measured relative movement.

14 Claims, 5 Drawing Sheets

Figure 1:
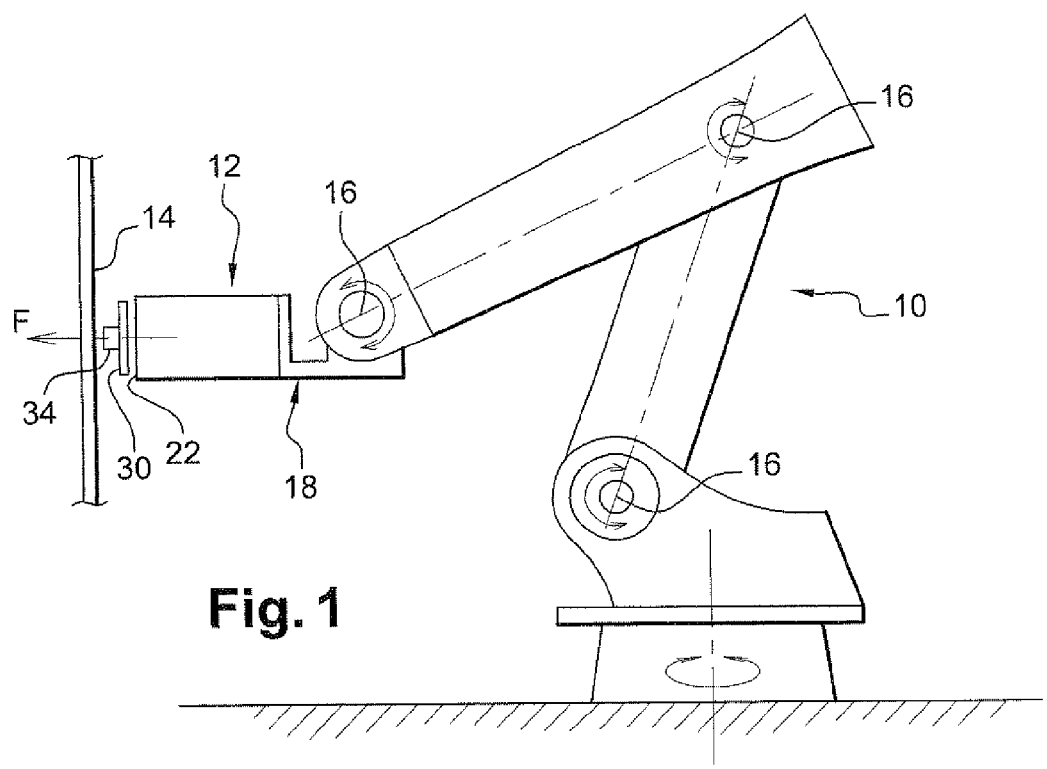

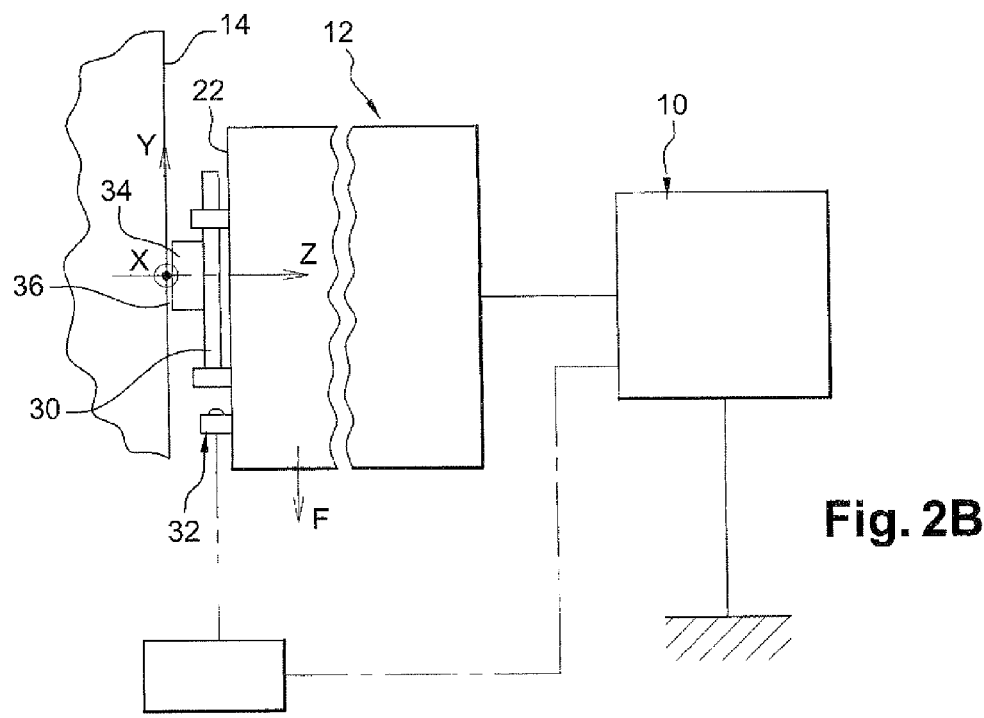
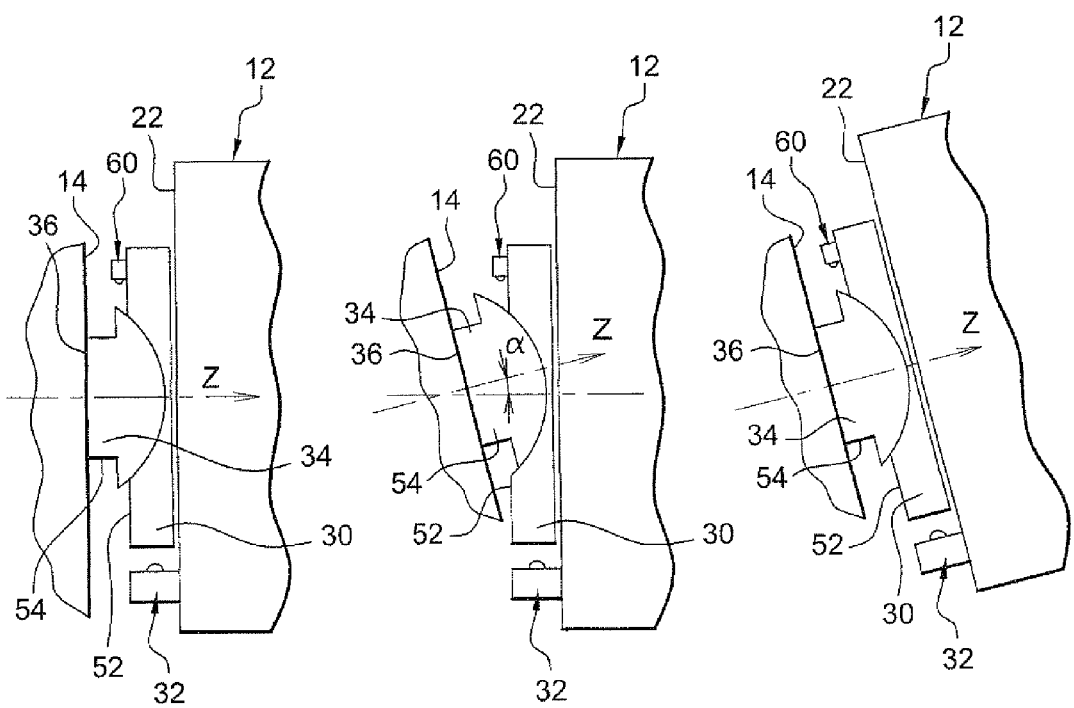
Fig. 3A    Fig. 3B    Fig. 3C

PROCESS FOR POSITIONING AN ASSEMBLY TOOL ON THE END OF AN ARTICULATED ARM AND DEVICE FOR ITS IMPLEMENTATION

BACKGROUND OF THE INVENTION

1. Field of the Invention

This invention relates to a process for positioning an assembly tool, such as, for example, a drilling or riveting tool located on the end of an articulated arm, making it possible especially to prevent sliding of the tool, and if necessary to correct the angle of incidence of the tool so as to position it perpendicular to the surface to be machined, the process of the invention being more particularly designed for the field of aeronautics. It likewise relates to a device for implementation of said process.

2. Description of the Related Art

In the field of aeronautics, many parts of the fuselage and of the wings of an aircraft are assembled by riveting. This assembly can call for stages consisting of positioning the pieces to be assembled relative to one another, drilling the two pieces, checking the holes if necessary, applying a sealing compound, installing a fastener such as a rivet, and finally checking the resulting assembly. These different stages are repeated for all of the holes that are placed according to a given mapping.

So that the components are correctly assembled, the mapping of the holes must be observed, and preferably the holes and/or the rivets must be arranged perpendicular to the surface.

To carry out this assembly, a first approach consists in using a special machine with Cartesian movements. This type of machine comprises a frame with two side rails along which a crosspiece can be relocated, along which crosspiece a telescoping arm can be relocated, on the end of which there can be a tool. The side rails, the crosspiece and the telescoping arm comprise the three axes of relocation, movements of rotation being possible at the level of the end of the arm.

The advantage of this type of machine is its having a rigid structure that allows application of relatively strong forces via the tool, especially during the drilling stage, while avoiding the sliding of the tool in order to observe the mapping of the holes.

However, this type of machine is subject to the major drawback of being stationary. Thus, it is necessary to move the elements to be assembled underneath this structure; this can entail a risk of damage for said elements. Moreover, this machine can only accept elements to be assembled that do not exceed a certain template function of the dimensions of the structure. Consequently, this type of machine is normally reserved for items of small overall dimensions.

Actually, even if it is possible to imagine a structure of large dimensions, the latter due to these dimensions would have dimensional variances such as would not allow the mapping of the holes to be followed. Moreover, the cost of such a structure would be prohibitive.

To mitigate these drawbacks, the assembly operation can be implemented by using an articulated arm that comprises on its free end a tool holder that is hereinafter called an effector.

The articulated arms can move easily around the structure of an aircraft during assembly; this allows assembly of elements of large dimensions and makes it possible to avoid moving them, in contrast to machines with Cartesian movements. According to another advantage, the articulated arms are products that are marketed in large numbers, such that this approach costs less than special machines with Cartesian movements.

In the known manner, an articulated arm generally includes a pivoting base on which a first segment is attached that can pivot along a first horizontal axis of rotation, a second segment being articulated along a second horizontal axis of rotation relative to the free end of the first segment. The free end of the second segment generally comprises a third articulation, or even a fourth articulation according to two essentially perpendicular axes of rotation.

These different articulations make it possible to move the effector in a space of three dimensions X, Y, Z and to orient it along three axes of rotation Rx, Ry, Rz.

The effector generally comprises a rigid frame with, to the front, a surface that can be pressed against the element to be machined or to be assembled, and to the rear, means of coupling to the free end of the articulated arm, said frame supporting a tool or a drum that integrates several tools as well as means for gripping, moving and operating said tool or tools and, if necessary, other accessories.

During drilling or assembly, the force applied by the tool is transmitted to the effector by the articulated arm. Means of measuring this force are generally provided at the level of coupling between the effector and the arm.

The primary drawback of this approach lies in the fact that the force that can be transmitted by the articulated arm is limited. Actually, even if the effector is rigid, the articulations of the articulated arm have a tendency to be deformed if the force exceeds a certain threshold, such that the tool tends to slide at the level of the surface and the mapping of the holes can no longer be observed. In the same way, if the force exceeds a certain threshold, the tool tends to no longer be perpendicular to the surface, which can ruin the quality of the hole or of the assembly.

SUMMARY OF THE INVENTION

In addition, this application intends to eliminate the drawbacks of the prior art by suggesting a process for positioning an assembly tool, such as, for example, a drilling or riveting tool located at the end of an articulated arm, allowing limitation of the risks of the tool sliding even if the articulated arm is applying significant force.

For this reason, the object of the invention is a process for positioning an effector relative to the surface comprising at least one tool that is provided to carry out an assembly stage such as, for example, drilling or riveting, said effector being attached to the end of an articulated arm that can apply via said effector a force against said surface, said effector comprising a front wall opposite said surface, characterized in that it consists in measuring a relative movement between the front wall and a support plate comprising at least one part that can be supported directly or indirectly against the surface and that can be stationary relative to said surface, and connected to the front plate so as to be able to be moved in at least one direction and to actuate said articulated arm such that it performs a movement designed to compensate for the relative measured movement.

BRIEF DESCRIPTION OF THE DRAWING FIGURES

Figure 2A:
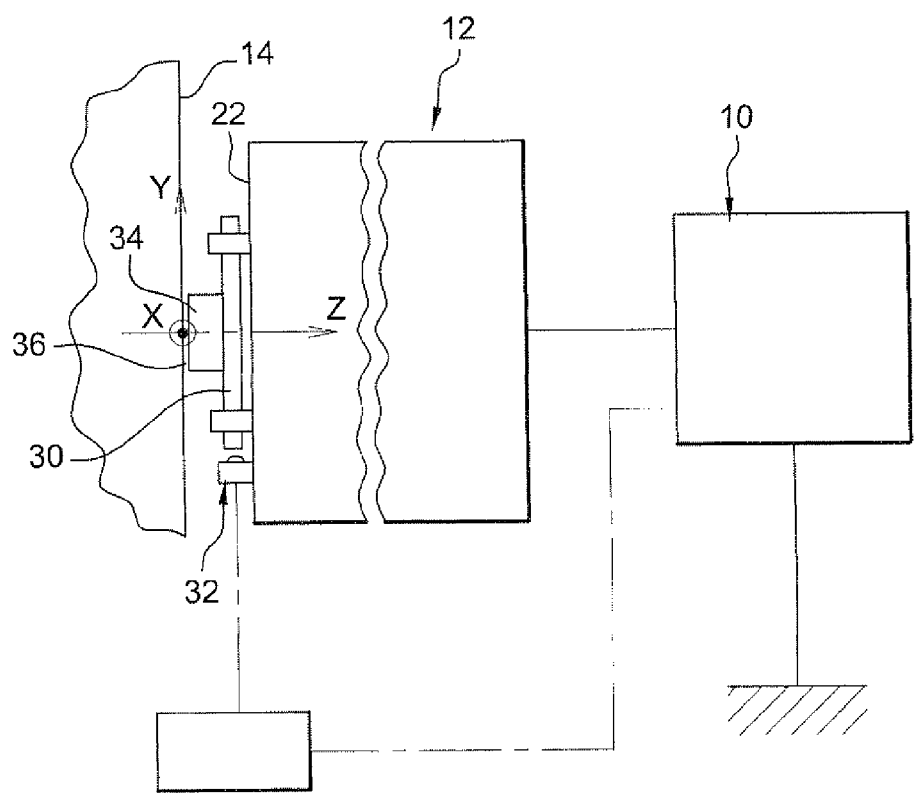
Figure 4:
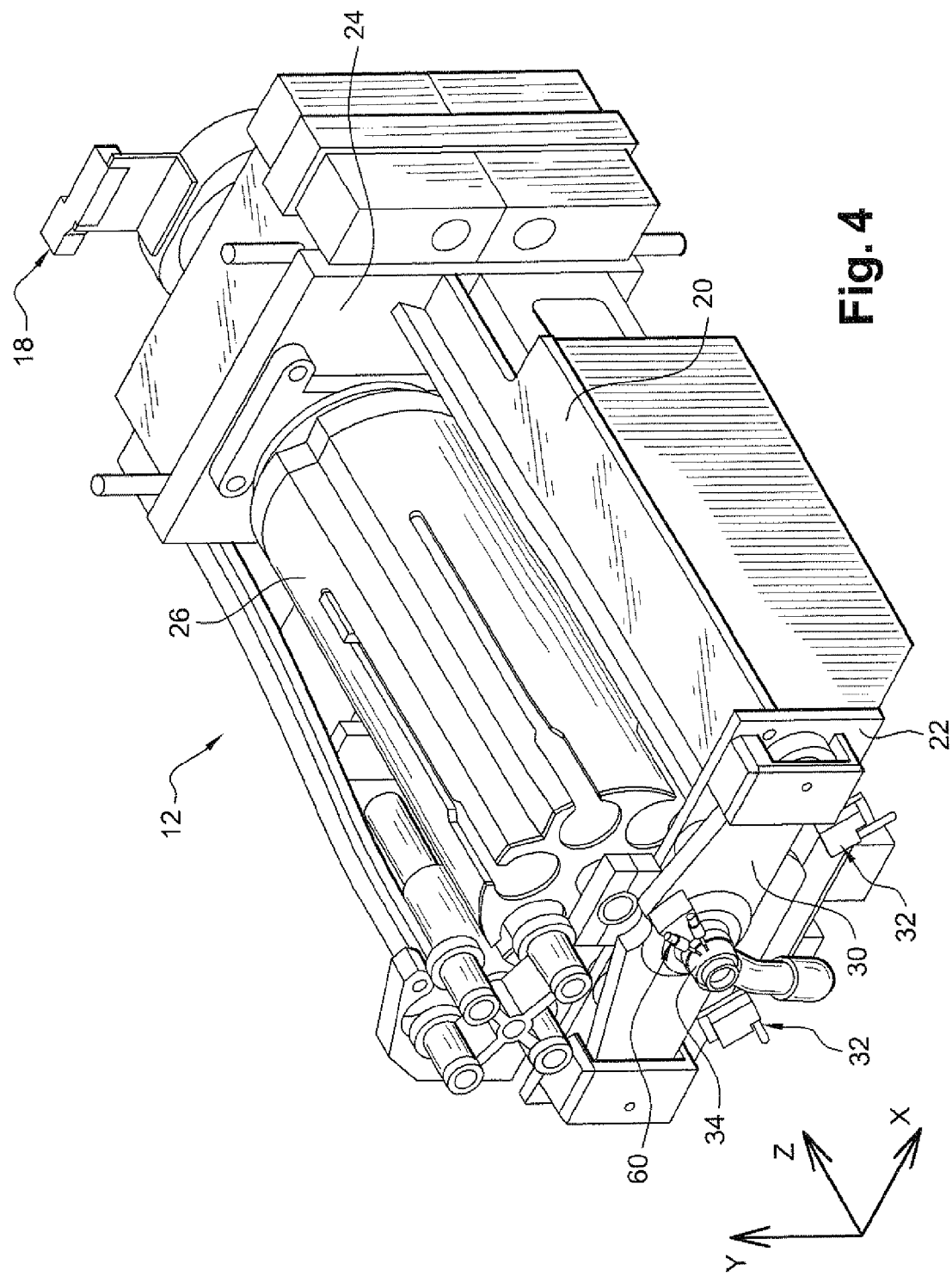
Figure 5:
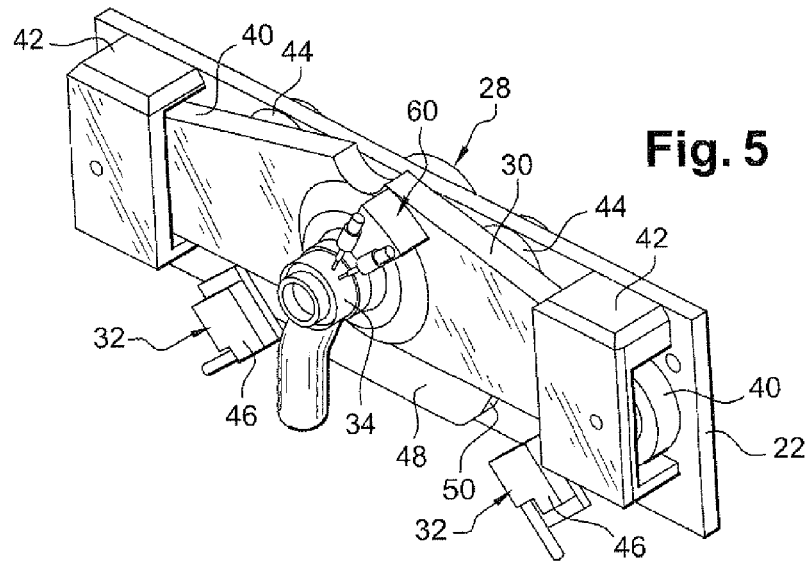
Figure 6:
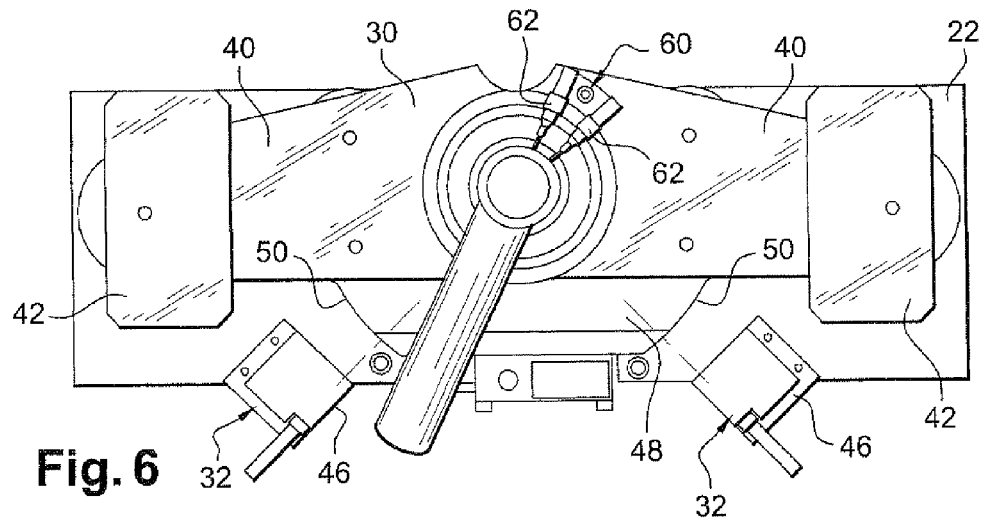
Figure 7:
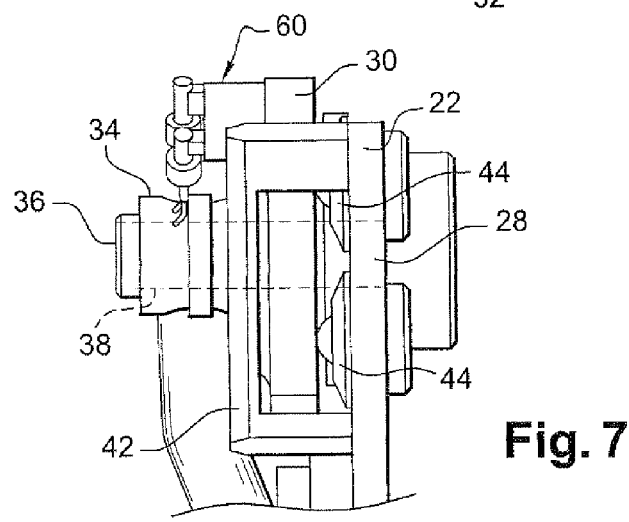
Figure 8A:
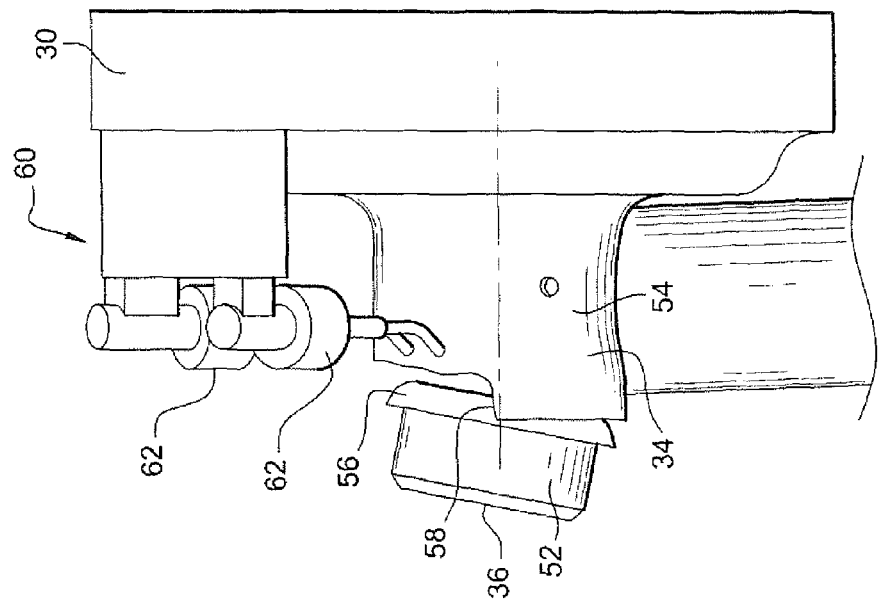
Figure 8B:
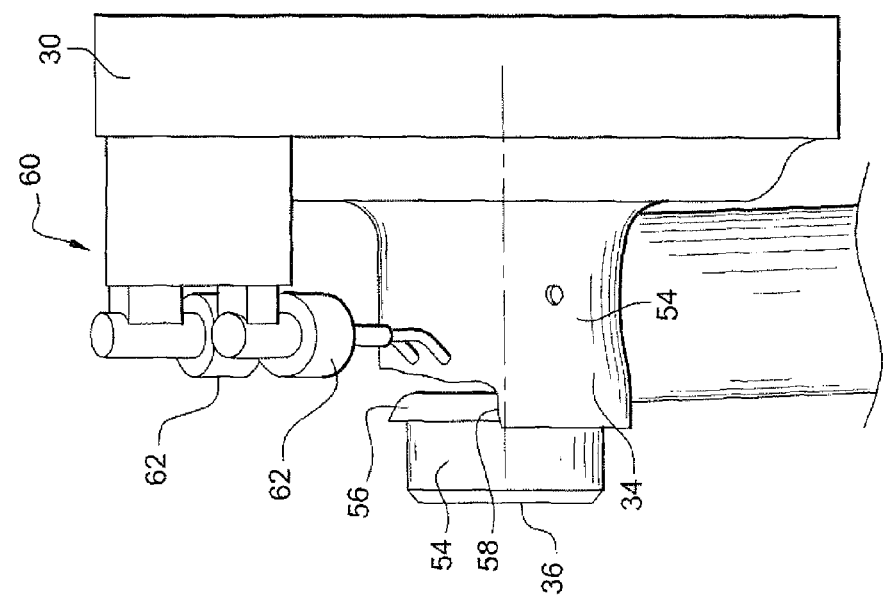

Other characteristics and advantages will become apparent from the following description of the invention, a description that is given only by way of example, with respect to the accompanying drawings, in which:

FIG. 1 is a diagram illustrating an articulated arm, to whose end an effector is attached, FIGS. 2A and 2B are diagrams of the effector illustrating compensation for the tool sliding, FIGS. 3A to 3C are diagrams of the nose of the effector illustrating correction of the tool orientation, FIG. 4 is a perspective view of an effector according to one preferred embodiment of the invention, FIG. 5 is a perspective view of the front of the effector, FIG. 6 is a head-on view of the front of the effector, FIG. 7 is a side view of the front of the effector, FIG. 8A is a side view illustrating in detail the nose of the effector when the tool is oriented perpendicular to a surface, and FIG. 8B is a side view illustrating in detail the nose of the effector when the tool is not oriented perpendicular to a surface.

DETAILED DESCRIPTION OF THE INVENTION

In FIG. 1, an articulated arm is shown at 10; it supports on its free end an effector 12 that can execute at least one stage of assembly of elements, such as, for example, the parts comprising the fuselage or the wing of an aircraft.

For the remainder of the description, an assembly stage is defined as one or more assembly stages consisting in positioning pieces to be assembled relative to one another, drilling the two pieces, if necessary checking the holes, applying a sealing compound, installing a fastener such as a rivet or checking the resulting assembly, this list not being exhaustive.

During certain assembly stages, especially during drilling, the articulated arm 10 is able to apply via the effector 12 a force F to a surface 14 of an element.

For the remainder of the description, the perpendicular line to this surface 14 corresponds to the axis Z of an orthonormalized reference, the axes X and Y being tangent to said surface.

The articulated arm comprises at least one articulation 16 and preferably several articulations 16, allowing the effector 12 to move within a space of three dimensions X, Y, Z and oriented according to three rotations Rz, Ry, Rz.

The articulated arm 10 on its free end includes means 18 for coupling to the effector 12 while allowing this connection to be detached, said means preferably comprising means for measuring the force F.

The articulated arm 10 as well as its control means will no longer be presented in detail since they are known to one skilled in the art.

According to one embodiment, the effector 12 comprises a frame 20 with a front wall 22 toward the front, a wall 24 toward the rear that ensures the connection to the articulated arm 10, a cradle being provided between the front wall and the rear wall to support at least one tool and preferably a drum 26 incorporating several tools.

The effector likewise comprises different means for moving the tool relative to the effector 12 and for putting it into motion.

Moreover, various devices can be attached to this effector, such as monitoring tools, a camera or others.

The effector as well as its various devices and equipment will no longer be presented in detail since they are known to one skilled in the art.

The front wall 22 comprises a duct or orifice 28 via which a tool can pass to reach the surface 14. The tool is positioned relative to this duct 28.

Since the connection between the tool and the effector 12 does not cause deformations that can ruin the positioning of the tool, the latter is perfectly positioned relative to the effector. Consequently, for the remainder of the description, the positioning of the effector corresponds to the positioning of the tool.

According to the invention, the effector comprises a front support plate 30 that can be moved parallel to the front wall 22 and that comprises at least one part that can be directly or indirectly supported against the surface 14 and that can be stationary relative to said surface. Thus, as illustrated in FIGS. 2A and 2B, the remainder of the effector can be moved parallel to said support plate 30 that is stationary relative to the surface 14.

In addition, the effector comprises means 32 for measuring the relative movements between the remainder of the effector 12 and the support plate 30.

The positioning process according to the invention consists in measuring a relative movement between the support plate 30 and the remainder of the effector 12 and in notifying the control means of said relative movement in order that said control means actuate the articulation or articulations of the articulated arm in order to compensate for said relative movement between the support plate 30 and the remainder of the effector.

Thus, it is possible to apply significant forces against the surface 14. In contrast to devices of the prior art, sliding no longer occurs between said surface 14 and the effector 12, but between the support plate 30 and the effector 12. The means 32 allow measurement of these relative movements between the support plate and the effector in order to compensate for said relative movement due to the opposite movements of the articulated arm.

According to one embodiment, a nose 34 of essentially cylindrical shape is rigidly attached to the support plate, its free end 36 being supported against the surface 14. The free end 36 comes in the form of a support surface that is essentially parallel to the support plate 30.

Thus, the end 36 of the nose 34 can be supported against the surface 14 and can be stationary, like the support plate 30, relative to said surface 14.

The nose 34 has a duct 38 that can be within the extension of the duct 28 so as to allow the passage of a tool.

According to one preferred embodiment that is illustrated in FIGS. 5, 6 and 7, the front wall 22 has a rectangular shape, the support surface having on either side two extensions 40 that can be held by two clamps 42 that are integral with the front wall 22. According to this installation, the support plate 30 can be moved in a plane that is parallel to the front wall 22 but cannot be relocated in the direction perpendicular to said front wall 22. Other technical approaches could be envisioned for obtaining this type of connection.

Preferably, means 44 are provided to promote this movement and to limit friction between the front wall 22 and the support plate 30. This configuration at the level of the connection between the support plate 30 and the front wall 22 allows concentration of possible deformations of the kinematic chain that proceeds from the base of the articulated arm as far as the contact point between the tool and the surface 14.

According to one embodiment, ball thrust bearings are provided at the level of the front wall, against which the support plate 30 can be supported.

According to a simplified variant, the support plate 30 can be relocated relative to the front wall 22 according to one single preferred direction, for example the axis Y.

According to a more detailed variant, as illustrated in the different figures, the support plate 30 can be moved relative to the front wall 22 according to different directions that are coplanar to the plane XY.

Advantageously, compensation is accomplished if the movement between the support plate 30 and the front wall 22 exceeds a certain threshold on the order of 0.2 mm, in order to limit the calculation time.

According to one embodiment, the means 32 that allow measurement of the relative movements between the support plate 30 and the front wall 22 comprise at least one sensor 46 of the optical type that is integral with the front wall 22.

If the support plate 30 can be relocated solely according to one relocation, a single sensor 46 is necessary.

If the support plate 30 can be relocated in several directions that are coplanar to the plane XY, two sensors 46 can be provided whose beams are oriented in two different directions, as illustrated in FIG. 6.

Preferably the beams of the sensors 46 form an angle on the order of 90°.

In addition, the support plate 30 can comprise an attached element 48 that offers one or more reflection surfaces 50 oriented essentially perpendicular to the beams of the sensors 46. This configuration makes it possible to obtain a better precision of the measurement of the relative movement between the support plate 30 and the front wall 22.

However, it is possible to provide other techniques for measuring this relative movement.

The positioning process of the invention that makes it possible to avoid the sliding of the tool is now described with respect to FIGS. 2A and 2B.

The tool is positioned relative to the surface 14 by the articulated arm and occupies a given position, as illustrated in FIG. 2A.

When it is desired to carry out an assembly stage, the nose 34 of the support plate 30 is applied to the surface 14 while exerting a force F. When this force exceeds a certain threshold, the articulations of the articulated arm tend to produce a movement of the effector relative to the surface 14. In contrast to the devices of the prior art, the part of the tool in contact with the surface does not slide. Deformations of the articulations cause relative movement of the front wall 22 of the effector relative to the support plate 30, shown by the arrow T in FIG. 2B. This relative movement is detected and measured by the sensor or sensors 46. Depending on this measurement, the control means of the articulated arm actuate a movement of said arm intended to compensate for the relative movement in order that the effector return to the given position, as illustrated in FIG. 2A.

According to another characteristic of the invention, the effector 12 comprises means for correcting the incidence of the tool so that the latter is essentially blended with the perpendicular line to the surface 14.

For this purpose, the support plate 30 comprises two parts, a first part 52 that is integral with the support plate 30 and a second part 54 that can be supported against the surface 14, a relative pivoting movement according to at least one pivoting axis being possible between the first part 52 and the second part 54.

According to one preferred embodiment, a relative pivoting movement according to at least two axes of rotation Rx and Ry is possible between the parts 52 and 54 of the support plate.

According to one preferred embodiment, the nose is made in two parts 52 and 54 connected via a ball-joint connection that does not allow any translational movement, but solely rotary movements between said parts 52 and 54. Thus, the second part 54 comprises one end 56 with an essentially spherical contact surface, and the first part 52 comprises a seat 58 likewise with an essentially spherical surface.

Means 60 for measuring the relative pivoting angle between the first part 52 of the nose and the second part 54 of the nose are provided. Depending on this measurement, the control means of the articulated arm actuate the articulation(s) of said articulated arm so as to correct said relative pivoting between the parts 52 and 54 of the nose so that the tool is arranged perpendicular to the surface 14.

Advantageously, a correction is made if the relative pivoting between the parts 52 and 54 of the support plate 30 exceeds a certain threshold on the order of 10 minutes of arc, in order to limit the calculation time.

According to one preferred embodiment illustrated in FIGS. 5A and 8B, the measuring means 60 comprise at least one sensor 62 that can measure the angle of relative pivoting in a plane that is integral with the first part 52. Advantageously, the means 60 comprise two sensors 62 that can measure the relative pivoting angle in two distinct planes so as to determine the pivoting movements along the axes of rotation Rx and Ry.

According to one embodiment, the sensors 62 are of the inductive type. However, other technologies could be envisioned.

The process for correction of tool incidence will now be described with reference to FIGS. 3A to 3C.

As indicated in FIG. 3A, the effector is oriented such that the tool is oriented perpendicular to the surface 14.

When the effector changes orientation, especially due to distortions at the level of the articulations of the articulated arm, the axis of the tool forms an angle α that is perpendicular to the surface, as illustrated in FIG. 3B. The second part 54 of the nose in contact with the surface 14 does not change orientation, in contrast to the first part 52 of the nose that is integral with the effector. Consequently, a relative pivoting appears between the parts 52 and 54 of the nose. This relative pivoting is detected and measured by the sensor or sensors 62. Depending on this measurement, the control means of the articulated arm actuate a movement of said arm designed to compensate for the relative pivoting in order that the tool be re-oriented perpendicular to the surface 14, as illustrated in FIG. 3C.

To facilitate reading the drawings, the pivoting angle has been exaggerated. By way of indication, in reality the pivoting angle is on the order of several degrees. Of course, the invention is obviously not limited to the embodiment shown and described above, but in contrast covers all of the variants, especially with respect to the forms and dimensions of the articulated arm as well the equipment of the effector.

The invention claimed is:

1. A process for positioning an effector relative to a surface, comprising:
   providing at least one tool configured to carry out an assembly stage, drilling or riveting, said effector being attached to an end of an articulated arm that can apply via said effector a force against said surface, said effector comprising a front wall and a support plate comprising at least one part that can be supported directly or indirectly against the surface and can be stationary relative to said surface;
   the support plate being movable in a plane that is parallel to the front wall;
   means to promote movement and to limit friction being provided between the front wall and the support plate;
   applying the support plate to the surface while exerting a force;

measuring a relative movement between the front wall and the support plate in directions parallel to front wall; and actuating said articulated arm so that the articulated arm performs a movement designed to compensate for the relative measured movement.

2. The process according to claim 1, wherein ball thrust bearings are provided on the front wall, against which the support plate can be supported.

3. The process according to claim 1, wherein two sensors are provided to measure relative movement between the front wall and the support plate in two different directions.

4. The process according to claim 1, wherein the compensation is accomplished if the relative movement between the support plate and the front wall exceeds 0.2 mm.

5. The process according to claim 1, further comprising:

measuring relative tilting movement of the support plate with respect to the front wall; and actuating the articulated arm to compensate for the measured relative tilting movement.

6. A process for positioning an effector relative to a surface, comprising:

providing at least one tool configured to carry out an assembly stage, drilling or riveting, said effector being attached to an end of an articulated arm that can apply via said effector a force against said surface, said effector comprising a front wall and a support plate comprising at least one part that can be supported directly or indirectly against the surface and can be stationary relative to said surface;

the support plate being movable in a plane that is parallel to the front wall;

means to promote movement and to limit friction being provided between the front wall and the support plate;

applying the support plate to the surface while exerting a force;

measuring a relative movement between the front wall and the support plate; and actuating said articulated arm so that the articulated arm performs a movement designed to compensate for the relative measured movement;

wherein two sensors are provided to measure relative movement between the front wall and the support plate in two different directions; and wherein the sensors emit two beams that form an angle of 90 degrees.

7. The process according to claim 6, wherein the support plate comprises reflection surfaces of the beams emitted by the sensors, which surfaces are perpendicular to said beams.

8. A process for positioning an effector, comprising:

applying a support plate to a surface while exerting a force that creates deformations of an articulated arm that cause relative movement of a front wall of the effector relative to the support plate, the support plate comprising at least one part that can be supported directly or indirectly against the surface and can be stationary relative to the surface, the surface comprising at least one tool configured to carry out an assembly stage, drilling or riveting, the support plate being configured to be moved in a plane that is parallel to a front wall of the effector, ball thrust bearings being configured to promote movement and to limit friction being provided between the front wall and the support plate;

measuring a relative movement between the front wall of the effector and the support plate of the effector in directions parallel to the front wall; and actuating the articulated arm so that the articulated arm performs a movement to compensate for a relative measured movement, said effector being attached to the an end of the articulated arm so that the articulated arm that can apply via said effector a force against the surface.

9. The process according to claim 8, wherein the ball thrust bearings are provided on the front wall, against which the support plate can be supported.

10. The process according to claim 8, wherein two sensors are provided to measure relative movement between the front wall and the support plate in two different directions.

11. The process according to claim 10, wherein the sensors emit two beams that form an angle of 90 degrees.

12. The process according to claim 11, wherein the support plate comprises reflection surfaces of the beams emitted by the sensors, which surfaces are perpendicular to said beams.

13. The process according to claim 8, wherein the compensation is accomplished if the relative movement between the support plate and the front wall exceeds 0.2 mm.

14. The process according to claim 8, further comprising:

measuring relative tilting movement of the support plate with respect to the front wall; and actuating the articulated arm to compensate for the measured relative tilting movement.

* * * * *

UNITED STATES PATENT AND TRADEMARK OFFICE
CERTIFICATE OF CORRECTION

PATENT NO. : 9,061,424 B2  
APPLICATION NO. : 12/278398  
DATED : June 23, 2015  
INVENTOR(S) : Philippe Prat et al.

Page 1 of 1

It is certified that error appears in the above-identified patent and that said Letters Patent is hereby corrected as shown below:

In the Specification:

Column 6,
Line 50 reads "articulated arm as well the equipment of the effector" and should read -- articulated arm as well as the equipment of the effector --.

Column 7,
Line 2 reads "the support plate in directions parallel to front wall; and" and should read -- the support plate in directions parallel to the front wall; and --.

In the Claims:

Column 8, Claim 8
Lines 23-25 reads "said effector being attached to thean end of the articulated arm so that the articulated arm that can apply via said effector a force against the surface" and should read -- said effector being attached to an end of the articulated arm so that the articulated arm can apply via said effector a force against the surface --.

Signed and Sealed this
First Day of March, 2016

Michelle K. Lee
*Director of the United States Patent and Trademark Office*